United States Patent [19]

Kanics

[11] 4,281,946

[45] Aug. 4, 1981

[54] PNEUMATIC CONVEYANCE DEVICE AND CONVEYING METHOD EMPLOYING PERCOLATION OF GAS INTO FLOWABLE BULK MATERIAL IN A FEED PIPE

[75] Inventor: Andras Kanics, Laasphe, Fed. Rep. of Germany

[73] Assignees: Bühler-Miag, Braunschweig; Metallgesellschaft Aktiengesellschaft, Frankfurt am Main, both of Fed. Rep. of Germany

[21] Appl. No.: 88,486

[22] Filed: Oct. 26, 1979

Related U.S. Application Data

[63] Continuation of Ser. No. 862,497, Dec. 20, 1977, abandoned.

[30] Foreign Application Priority Data

Dec. 20, 1976 [DE] Fed. Rep. of Germany ....... 2657677

[51] Int. Cl.³ ............................................. B65G 53/06
[52] U.S. Cl. .................................................... 406/95
[58] Field of Search ...................... 406/86, 88, 89, 93, 406/94, 95

[56] References Cited

U.S. PATENT DOCUMENTS

| 2,785,018 | 3/1957 | McKenna | 406/95 |
| 2,882,097 | 4/1959 | Hamren | 406/88 |
| 3,253,865 | 5/1966 | Kanics | 406/86 |

FOREIGN PATENT DOCUMENTS

| 2022962 | 11/1971 | Fed. Rep. of Germany | 406/95 |
| 1035584 | 7/1966 | United Kingdom | 406/89 |

Primary Examiner—Jeffrey V. Nase
Attorney, Agent, or Firm—Blanchard, Flynn, Thiel, Boutell & Tanis

[57] ABSTRACT

An apparatus and method for the pneumatic conveyance of bulk material and like products in a horizontal or inclined feed pipe which is filled with the product and is supplied with a gas along its length. The feed pipe has an elongated single chamber with an inlet and an outlet. The inlet is constructed so that the product will continuously flow into the inlet under the force of gravity. A plurality of individual percolation inlets are provided and which communicate with the lower region of the feed pipe. Each of the percolation inlets is connected to a gas supply. The pressure level of the gas supply and the size of the percolator inlets are dimensioned such that the gas is permitted to be continuously supplied to the feed pipe slowly and without turbulence in such quantity that the product is permeated beyond its capacity with the gas and thus undergoes an expansion in its volume which progressively increases along the length of the feed pipe from the inlet to the outlet while the feed pipe remains in communication with the hopper.

23 Claims, 3 Drawing Figures

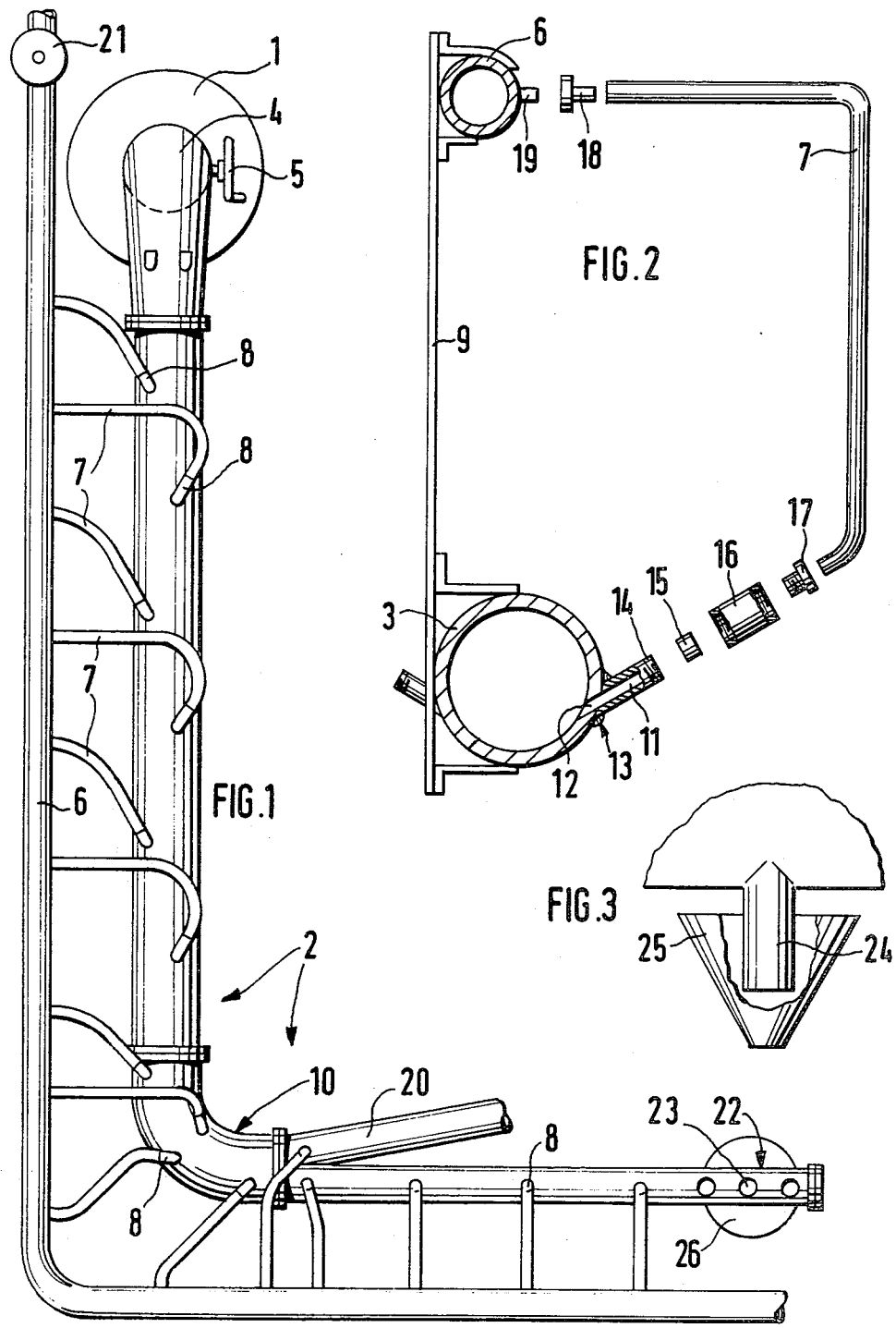

PNEUMATIC CONVEYANCE DEVICE AND CONVEYING METHOD EMPLOYING PERCOLATION OF GAS INTO FLOWABLE BULK MATERIAL IN A FEED PIPE

This is a continuation, of application Ser. No. 862,497, filed Dec. 20, 1977, now abandoned.

FIELD OF THE INVENTION

The invention relates to a method and a device for the pneumatic conveyance of flowable bulk material, viscous substances, sludges or the like in a feed pipe which is filled with the product to be conveyed and is supplied with a gas along its length.

BACKGROUND OF THE INVENTION

Measures of this type are usually used when flowable bulk material, viscous substances, sludges or the like are to be removed from a storage tank and are to be supplied to further stations.

For this type of conveyance work, so-called pneumatic grooves were used hitherto. These grooves contain two chambers which are disposed one above the other and are separated one from the other by a partition made of a porous material, the lower chamber being filled with a gas and the upper chamber being filled with the product to be conveyed, such that only an incomplete cross-sectional filling is achieved. The space kept free above the product which has been inserted serves as the expansion and collecting space and also serves as the discharge conduit for the gas which is pressed through the porous partition and the product located thereon and is supplied therefrom to a gas-supplying device connected to the upper chamber. During the passage of the gas, the product located on the porous partition is to be converted into a suspended state, i.e. fluidized, and should therefore be able to flow away like a fluid when the feed pipe is suitably lowered.

It can be seen therefrom that the known arrangements cause, on the one hand, the feed pipe to have a relatively large overall height and, in addition, still do not operate without lowering the feed pipe, this leading to an immense space being needed in the vertical direction and consequently leading often to a considerable loss of storage room. Quite irrespective of this, there is in this case the danger that heterogeneous products are separated with components of variable granular size, as a result of the flow of gas through the product, so that the coarse-grained components are precipitated on the partition and the fine-grained components are carried upwards. Besides there being a separation, there may also be a change in consistency. The precipitating layer of coarse-grained components is no longer fluidizable to the desired extent, and this must cause the entire feed pipe to sag sooner or later and necessitates its removal. This disadvantage is even apparent during the processing of relatively coarse-grained material. However, even with pulverulent products of homogeneous consistency, problems may arise if materials are involved which have a relatively heavy bulk density since the gas requirement increases with the bulk density. In any case, the energy costs are not inconsiderable. Moreover, the partition has to be cleaned or replaced from time to time since the dust in the air spoils this partition. However, since quality materials are used in this case and, on the other hand, the partition face is not inconsiderable in the known arrangements, the expense associated therewith is also still very considerable. There are also problems with the known arrangements if it is necessary to alter the direction of the feed pipe.

The object of the invention, therefore, is to provide by simple and economical means, both from the point of view of manufacture and from the point of view of continuous operation, a method and a device whereby, avoiding the disadvantages of known solutions, any fluid bulk material, viscous substances, sludges or the like can be conveyed in a level feed pipe so that not only is a comparatively high throughput achieved with a low input of power and a small cross-section for the pipe, thus creating extremely high efficiency, but the conveying process itself is also made easily controllable.

According to the invention, this object is achieved in that the feed pipe is filled with the product to be conveyed over its entire cross-section, this product being subjected to a pneumatic deposit, which increases in the conveying direction and has no state of suspension, using a gas which is caused to percolate into the feed pipe, in that a slow turbulence-free velocity and a substantially uniform distribution over its respective cross-section of entry is imposed upon the percolating gas prior to its being introduced into the feed pipe and in that the percolating gas is supplied continuously.

A device according to the invention for carrying out the method is characterised in that the feed pipe is constructed as a single-chambered pipe of undivided cross-section, this pipe being able to be filled with the product to be conveyed over its entire cross-section and having nozzle-less percolation inlets which are disposed along its length and are connected to a gas supply.

Since the pipe cross-section is completely filled with the product, no gas expansion chamber or discharge chamber can be formed. There is therefore no free gas flow here. Rather, the gas which is caused to percolate into the product to be conveyed produces a loosening and increase in the bulk material gas volume and thus, advantageously, an expansion of volume and a reduction in the bulk density, a conveying process thereby being effected. The suspended state which cannot be eliminated in the prior art does not, however, occur. The gas which has percolated into the product to be conveyed, but which is no longer to be retained thereby automatically seeks the path of least resistance which runs here in the direction of the product output. Since the gas advances along this path rather more quickly than the product itself, the gas throughput per cross-section increases because of the supply which is added from the rear as it comes closer to the product output. Compared with the prior art, however, the gas velocity in this case is extremely low, so that no particles can be dragged along. Because of the increasing gas throughput, the consistency of the product to be conveyed is loosened more and more along the length of the pipe as the product comes closer to the product output, i.e. the air portion increases and thus the inner and outer friction, as well as the bulk density, are reduced. Consequently a quasi-fludization advantageously results in the conveying direction, the conveying process being assisted thereby.

The measures according to the invention require an extremely small amount of gas which may have an exponential equation of several powers less than in the prior art. Advantages thus arise regarding the energy requirement, the supply unit whose dimensions have to be correspondingly small and the much better use of the filling station which is connected to the feed pipe. In addition, the extremely low gas requirement makes a so-called recycling substantially easier and cheaper, there is also no danger of dust explosions with the small gas quantities and the granular composition and consistency are maintained within the pipe cross-section. The minimum development of dust also leads to a relieving of the peripheral units, such as dust filters, etc.

Gas filling occurs advantageously in an automatically controlled manner, all kinds of susceptibilities being practically eliminated thereby. Gas may only enter in the region of such percolation inlets where expansion and gas absorption are possible. It can be seen therefrom that the conveying process of the invention continues automatically rearwards of the output where expansion can occur at the earliest, for example during re-starting after a conveyance stop until the entire feed pipe is covered. To control the conveyance, the air supply can be turned on or off without fear of the feed pipe suffering a so-called "sagging" when the air supply is stationary. The measures according to the invention therefore produce a conveyor path, which can be controlled extremely easily, with brief controlled dead times which were hitherto not considered possible, with a high degree of operational reliability, with easy controllability and with excellent efficiency.

A simple round pipe may advantageously be used for the feed pipe and this considerably reduces the manufacturing costs. According to a further proposal of the invention, a slow turbulence-free velocity is imposed upon the percolating gas prior to its introduction into the feed pipe. For this purpose, the percolation inlets are suitably so dimensioned that their cross-section is very large compared with the usual cross-section for a nozzle. On the other hand, however, this cross-section is still relatively small compared with the cross-section of the feed pipe. The percolation inlets may therefore be constructed simply as wall recesses provided with a connecting piece. To effect a tight and secure connection which, nevertheless, can be produced easily and therefore economically, the connecting pieces may be simply welded into the wall of the feed pipe and be provided substantially at the rear with a thread for the connection of a supply pipe.

A substantially uniform distribution is advantageously imposed upon the percolating gas by way of its respective inlet cross-section. One respective percolating gas distributing device which covers the entire inlet cross-section like a filter may be provided for this purpose in the region of the percolation inlets. A further retardation of the percolating gas is hereby achieved.

To prevent the product from penetrating the gas supply, at least one respective gas-permeable product block may be disposed advantageously in the region of each percolation inlet. A particularly simple and therefore economical embodiment may be achieved in this case by designing the percolating gas distributing device, which is in the form of a filter and also produces a certain degree of gas retardation, simultaneously as the product block. For this purpose, substantially a narrow-meshed filter, made substantially of ceramic material, sintered metal and/or a textile fabric, may suitably be used. These filters should be easy to replace. A relief valve is advantageously disposed in front of the filter.

A further advantageous embodiment of the invention lies in providing a plurality of percolation inlets which are distributed substantially uniformly along the length of the feed pipe. In the region where the feed pipe changes direction there is appropriately a slightly greater concentration of percolation inlets than in adjacent straight regions.

A further advantageous measure is to give the percolating gas a long path. For this purpose, the connecting pieces which are inserted into associated wall recesses may advantageously slope relative to the axis of the feed pipe. This also prevents the passing product from falling into the connecting pieces. The connecting pieces therefore slope appropriately in the conveying direction towards the axis of the feed pipe, and this simplifies the removal of any deposits. The connecting pieces may advantageously be directed substantially into the lowest region of the feed pipe, and this in particular enables a particularly sharp reduction in friction to be achieved here. Because successive connecting pieces or respectively the percolation inlets supplied therewith are staggered laterally relative to each other, the concept of a quick discharge of gas is advantageously opposed and consequently an almost uniform shape for the desired percolation field is sustained.

According to a further inventive concept, the supplied quantity of percolating gas is advantageously selected so that the volumetric capacity of the product to be conveyed is exceeded. This may be effected crudely by a corresponding number of percolation inlets. Fine adjustment may be achieved in a simple manner by means of an appropriate flap, etc. in the gas supply.

During normal operation there is a continuous supply of percolating gas. This is achieved in that the connecting pieces are connected to a common collecting pipe by means of a respective flexible connecting pipe. The collecting pipe may be mounted on the feed pipe. Individual percolation inlets may be rendered inactive by interrupting the connecting pipe, whereby it is possible to adapt to the circumstances of each individual case.

To stop the product output, it is sufficient to stop the percolating gas supply to the feed pipe. The percolating gas supply is merely recommenced for the purpose of starting or re-starting.

For the emptying of the feed pipe, the product filling process is merely to be stopped. For this purpose, the product inlet in the feed pipe may be provided with a preferably remote-controllable, slide valve.

For the elimination of dust, the feed pipe in the region of its front edge may be provided with a dust filter installed in a gas outlet. Because of the relatively slight filling of gas here and therefore also because of an extremely reduced development of dust, this dust filter may advantageously have extremely small dimensions.

If air serves as the percolating gas, then this air can be removed from the compressed-air system and be released into the atmosphere. The air requirement is so slight that no substantial loading of the compressed-air system is to be feared here. Because of the low gas requirement, however, the measures according to the invention also simplify a so-called recycling of the percolating gas which, for this purpose, is kept in a closed circuit. In addition, the gas outlet may advantageously be connected to the suction connection of a fan which acts upon the collecting pipe.

Further features and advantages of the invention can be seen from the subsequent description of one embodiment with reference to the drawing in conjunction with the claims.

BRIEF DESCRIPTION OF THE DRAWINGS

FIG. 1 is a view of a feed pipe according to the invention as seen from below,

FIG. 2 is a section through a preferred embodiment of the invention and

FIG. 3 shows one example for an advantageous form of the product output.

DETAILED DESCRIPTION

In FIG. 1, 1 indicates a silo for accommodating, for example, granulated plastics material, the content of this silo being able to be supplied to a filling station, for example, a sagging unit, which is not shown more fully here, by way of a feed pipe which is denoted as a whole by 2. As the section in FIG. 2 shows, the feed pipe 2 which is conveniently formed by a commercially conventional pipe 3 with an undivided cross-section is to be filled accordingly with the product to be conveyed over its entire cross-section. A simple curved pipe 4 is used therefore to connect the pipe 3 to the silo outlet connection. The feed pipe 2 is filled by the action of the pressure, caused by the inherent weight, of the product column existing in the silo 1. A blocking element 5 may serve to block the outlet funnel of the silo 1. The conveying process in the feed pipe 2 is started and continued, in that, a gas, preferably air in the embodiment, is caused to percolate into the product which is to be conveyed, and is hereby deposited pneumatically, and this leads to a loosening of the consistency and an increase in the air bulk material volume and thus produces a forward movement because of the counter-pressure existing at the silo end.

In order to supply the feed pipe 2 with the necessary air, an air collecting pipe 6 is used which is connected to the compressed-air system, runs parallel to the feed pipe 2 and is connected by way of branch pipes 7 to associated longitudinally distributed percolation inlets 8 in the feed pipe 2. The air collecting pipe 6 is mounted on the feed pipe 2 by means of pipe clamps 9.

The individual percolation inlets 8 are distributed substantially evenly along the length of the feed pipe 2. One exception to this is in the region where the feed pipe 2 changes direction, this being effected by inserting an appropriate curved pipe 10. The concentration of percolation inlets 8 in the curved pipe 10 is rather greater than in the adjacent straight stretches. In the region where the feed pipe 2 changes direction, a particular loosening effect is achieved hereby with a corresponding reduction in the internal and external friction of the material to be conveyed, thus producing an extremely good curve-negotiating ability. The distance between, and the size of, the percolation inlets 8 are preferably to be selected so that the quantity of air, which can be introduced for each formation of the pneumatic deposit according to the invention, can no longer be fully absorbed and retained by the product to be conveyed, but flows away forwards at least partially along the path of least resistance, thus producing a quasi-fluidization, superimposed on the loosening and expansion features mentioned above, in the flow direction with a simultaneous advancing effect.

In the embodiment, the percolation inlets 8 are designed as nozzle-less wall recesses 12 which are provided with a connecting piece 11. The cross-section of the wall recesses 12 is accordingly kept relatively large compared with a conventional nozzle cross-section. Each nozzle effect, which naturally would have to lead to a high air speed and consequently, of necessity, to a fractionation of the material to be conveyed, is hereby effectively avoided. On the other hand, the cross-section of the wall recesses 12 may be kept relatively small compared with the pipe cross-section of the pipe 3 which forms the feed pipe 2, since the conveying process can in fact be actuated with relatively small quantities of air. As indicated at 13, the connecting pieces 11 may be welded to the pipe 3. In the rear region, a thread 14 is provided for the connection of the branch pipe 7 which is preferably formed by a flexible pipe piece. A distributing device which covers the entire inlet cross-section like a filter is provided on the connecting pieces 11 for the uniform distribution of the percolating air over the entire cross-section. This leads to an extremely slow turbulence-free air speed in the laminar region during full utilization of the cross-section. To prevent the product penetrating the air supply through the wall recesses 12, product blocks may be provided in the region of each wall recess. In the embodiment, the distributing device 15, which is advantageously formed by a narrow-meshed filter made of sintered metal, etc., may be used simultaneously to form a product block, so that any further outlay therefor can be eliminated. From the point of view of servicing, the filter 15 is to be easily replaceable, held, for example, by means of a retaining nut. In the embodiment, a relief valve 16 is disposed in front of the filter 15 so that the filter is secured to the rear end face of the connecting pieces 11 by means of the valve housing. By means of appropriate coupling pieces 17 and 18, the branch pipe 7 can be attached to the valve housing, on the one hand, and to associated connection pieces 19 of the collecting pipe 6, on the other hand.

As can be seen from FIGS. 1 and 2, the wall recesses 12, forming the percolation inlets 8, may be disposed in alternating sequence on different respective sides of the pipe 3 forming the feed pipe 2, thus causing a balanced filling of air over the pipe cross-section. A straight line of percolation inlets may also be used for weaker pipes, as indicated in FIG. 1 after the fork in the pipe 20. The wall recesses 12, forming the percolation inlets 8, appropriately extend in the region of the lower half of the pipe, thus ensuring that even the lower cross-sectional areas, which are usually set more strongly therein, are plentifully supplied with percolating gas. As indicated with reference to the percolation inlets 8 which are provided in the region of the fork in the pipe 20 and are disposed in one line, the wall recesses 12 and the connecting pieces 11 attached thereto may in this case extend substantially vertically downwards. In the case of percolation inlets 8 which are staggered laterally, these inlets may be appropriately disposed, as can be seen in particular in FIG. 2, so that the axis of the wall recess 12 and the connecting piece 11 attached thereto intersects substantially the lowermost surface line (generatrix) of the internal circumference of the pipe 3. Because a simple starting method is simultaneously provided in the conveying direction, it is also possible for product extras, which settle substantially in the region of the recesses 12 or the connecting pieces 11 attached thereto, to be easily re-introduced into the general product flow by means of the air which pushes rearwards. Because of the above-described arrangement of the percolation inlets 8 in the region of the lower half of the pipe, a relatively long percolation path is simultaneously advantageously achieved and this is not undesirable in view of a pneumatic deposit on all sides if possible.

OPERATION

The above-described arrangement operates as follows:

The feed pipe 2 is filled gravitationally with the product to be conveyed from the silo 1 by way of the entire cross-section of the pipe. If the collecting pipe 6 is filled with gas, then the percolating air forms a pneumatic deposit which causes the product to move forward. Since air may only be introduced in the region of such percolation inlets 8, where a loosening of consistency and an expansion are possible, the conveying process commences automatically. As soon as the air supply is stopped, the conveying process also comes to an immediate standstill. In this case, therefore, the conveying process can be stopped or started easily by opening or switching off the air supply. For this purpose, a slide valve 21 in the collecting pipe 6 may be used. The air supply can be adapted to the circumstances of the individual case by means of this slide valve. Individual slide valves may also be disposed in the connecting pipes 7.

A further component of the conveying process of the invention may also be seen in the pushing force produced by the air which travels forwards more quickly than the material to be conveyed. The counter-support is produced by the inherent pressure arising from the silo 1. Contrary to the prior art, the feed pipe 2 does not therefore need to be even lowered, but can in fact still overcome an incline according to the counter-pressure. For the emptying of the feed pipe 2, the product supply from the silo 1 is simply blocked, the product quantity still in the feed pipe 2 then being brought out according to the blow-pipe effect.

The product which is conveyed to the output station 22 may be discharged here because of its inherent weight. For this purpose, the feed pipe 2 comprises opening ports 23. A plurality of such opening ports may be disposed one behind the other. The opening ports 23 may advantageously be designed as wall recesses in the lower region of the pipe 3 forming the feed pipe 2. The opening ports 23 may, for example, be sealed by means of flaps. It is advantageous to attach to each wall recess an immersion pipe 24 whose lower end discharges into a dosing funnel 25, the opening cross-section of this funnel permitting an accurate dosing of the discharged product quantity. A dust filter 26 is connected to feed pipe 2 adjacent the outlet to remove any dust particles that accumulate adjacent the outlet ports 23.

The embodiments of the invention in which an exclusive property or privilege is claimed are defined as follows:

1. In a method for the pneumatic conveyance of bulk material, viscous masses, sludges and other like product in a feed pipe which is horizontal or somewhat upwardly inclined toward its outlet, in which the feed pipe contains a quantity of said product and is supplied with gas over its length, the improvement wherein said feed pipe is a single chamber pipe of undivided cross section having a product inlet and comprising the steps of:

supplying said product by the force of gravity to said product inlet of said feed pipe and therewith filling the pipe over its entire cross section;

feeding percolator gas continuously and slowly and without turbulence into said feed pipe through individual percolator inlets directed into the lower region of said feed pipe, said feeding including selecting the quantity of gas fed and thereby permeating said product with gas beyond the volumetric capacity of said product and causing expansion of the volume occupied by a unit weight of said product and consequently decreasing the angle of repose of said product, and progressively increasing said expansion of said volume occupied by a unit weight of said product and consequently decreasing the angle of repose of said product with said gas along the length of said feed pipe from the product inlet of said feed pipe to the outlet thereof until the entire cross section of said feed pipe is filled with said product, while avoiding significant suspension of product particles in said gas.

2. The improved method according to claim 1, wherein said gas is evenly distributed over its respective percolator input cross section.

3. The improved method according to claim 1, wherein in an area where said feed pipe changes direction, the quantity of gas introduced into said feed pipe per unit of length of said feed pipe is greater than in adjacent straight stretches of the feed pipe.

4. The improved method according to claim 1, wherein said product is removed from said feed pipe by the force of gravity.

5. The improved method according to claim 4, wherein said product removal occurs through several holes which are arranged one behind the other.

6. The improved method according to claim 1, wherein for stopping and starting of conveying of said product which is in said feed pipe, said gas supply to said feed pipe is respectively stopped and started and wherein the conveying process comes to an immediate standstill when the gas supply is stopped.

7. The improved method according to claim 1, wherein for emptying said feed pipe of said product, the input of product to said feed pipe is stopped.

8. In a feed pipe for the pneumatic conveyance of flowable bulk material, viscous substances, sludges and other like products, the improvement comprised in that said feed pipe is constructed as an elongated single chamber which has an undivided cross section, said feed pipe having at least one outlet, product supply means connected to an inlet of said feed pipe for filling the feed pipe over its entire cross section with said product, said product being fed to said inlet by the force of gravity from said product supply means located thereabove, said feed pipe being horizontal or somewhat upwardly sloped from said product inlet to said outlet, gas supply means connected over the length of said feed pipe for permeating the product therein beyond its capacity with gas and therewith expanding the volume occupied by a unit weight of said product in a progressively increasing manner along the length of said feed pipe from said product inlet to said outlet with a corresponding decreasing in product angle of repose until the entire feed pipe is filled with said product, said gas supply means including a gas supply line and a low pressure gas source and a plurality of similar percolation inlets distributed over the length of said feed pipe and which point into the lower area of said feed pipe, said percolation inlets each being connected to said gas supply line and said low pressure gas source, said product supply means and said feed pipe being free of gas inlets in addition to said percolation inlets, the pressure level of said gas source and the size of said percolator inlets being dimensioned such that through said percolation inlets gas is continuously supplied to said feed pipe slowly and without turbulence in such quantity that said product undergoes said permeation beyond its capacity with said gas and said expansion in volume occupied by a unit weight of product progressively along the length of said feed pipe, said percolation inlets including means adjacent the feed pipe for blocking entry of product into said gas line while admitting said gas to said feed pipe.

9. The improved feed pipe arrangement according to claim 8, wherein said percolation inlets include passageway means through the wall of said feed pipe and a connecting piece, the cross section of said passageway means being small compared with the cross section of said feed pipe and sufficiently large so that a turbulence does not occur during entry of said gas into said feed pipe.

10. The improved feed pipe arrangement according to claim 9, wherein each connecting piece is welded to said feed pipe and has a thread for facilitating a connection to said gas supply line.

11. The improved feed pipe arrangement according to claim 9, wherein said passageway means and connecting pieces which form said percolation inlets are inclined with respect to the longitudinal axis of said feed pipe and are directed into the lower portion of said feed pipe.

12. The improved feed pipe arrangement according to claim 9, wherein said connecting pieces are each connected by means of a flexible connecting line to said gas-supply line.

13. The improved feed pipe arrangement according to claim 9, wherein said product blocking and gas admitting means comprises a gas filter device which covers the entire cross section of said percolator inlet, said filter device having a narrow-mesh filter element which consists of one of a ceramic material, a fabric and of a sinter metal.

14. The improved feed pipe arrangement according to claim 13, wherein said gas filter device has a characteristic of forming a gas-permeable product block.

15. The improved feed pipe arrangement according to claim 8, wherein said product blocking and gas admitting means between said feed pipe and said gas-supply line includes a relief valve.

16. The improved feed pipe arrangement according to claim 8, wherein said percolution inlets are distributed approximately uniformly over the length of straight sections of said feed pipe.

17. The improved feed pipe arrangement according to claim 16, wherein said percolation inlets are spaced closer together on an arc in said feed pipe than in the straight sections thereof.

18. The improved feed pipe arrangement according to claim 8, wherein said feed pipe is provided with discharge holes at its outlet, which holes are arranged in the lower surface of said feed pipe.

19. The improved feed pipe arrangement according to claim 18, wherein several discharge holes are arranged one behind the other.

20. The improved feed pipe arrangement according to claim 18, wherein said outlet further includes an immersion pipe which discharges into a funnel, said immersion pipe being connected to said discharge holes.

21. The improved feed pipe arrangement according to claim 8, wherein said feed pipe is divided to define a forked section.

22. The improved feed pipe arrangement according to claim 8, wherein said feed pipe includes a dust filter which is connected to a gas outlet in the region of its front end.

23. In a conveying trough, constructed substantially in the form of a pipe, for the pneumatic conveyance of flowable bulk material, sludges and other like products, the improvement comprised in that the conveying trough is constructed as a single chamber pipeline of undivided cross section having at least one product outlet and a product inlet, which pipeline can be loaded over its entire cross section with the product to be conveyed, means supplying said product to the product inlet of the pipeline by the force of gravity, said pipeline being horizontal or somewhat upwardly sloped from its product inlet to its product outlet, said pipeline being provided over its length with individual percolation inlets which point into the lower area of the pipeline, gas supply means including a gas supply line with said percolation inlets connected thereto and dimensioned for continuously supplying the pipeline with percolating gas in such amount that the product to be conveyed is loaded with percolating gas beyond its capacity to cause expansion of the volume occupied by a unit weight of product and a progressive increase in said volume occupied by said unit weight of said product from the product inlet to the product outlet of said pipeline until the entire cross section of said pipeline is filled with said product, said expansion of said volume occupied by said unit weight of product being accompanied by a reduction in the angle of repose of such unit weight of product.

* * * * *

UNITED STATES PATENT AND TRADEMARK OFFICE
CERTIFICATE OF CORRECTION

PATENT NO. : 4 281 946
DATED : August 4, 1981
INVENTOR(S) : Andras Kanics

It is certified that error appears in the above—identified patent and that said Letters Patent is hereby corrected as shown below:

Col. 9, line 29; change "9" to ---8---.

line 45; change "percolution" to ---percolation---.

Signed and Sealed this

Eighth Day of December 1981

[SEAL]

Attest:

GERALD J. MOSSINGHOFF

Attesting Officer    Commissioner of Patents and Trademarks